United States Patent [19]
House

[11] Patent Number: 5,881,904
[45] Date of Patent: Mar. 16, 1999

[54] COVER FOR CHEMICAL DISPENSING HOPPER

[76] Inventor: John L. House, P.O. Box 552, Oak Grove, La. 71263

[21] Appl. No.: 880,025

[22] Filed: Jun. 20, 1997

[51] Int. Cl.$^6$ .................................................. B65D 69/00
[52] U.S. Cl. .......................................... 220/524; 220/526
[58] Field of Search .................................... 220/520, 524, 220/523

[56] References Cited

U.S. PATENT DOCUMENTS

| | | |
|---|---|---|
| 950,844 | 3/1910 | Dolan . |
| 1,184,549 | 5/1916 | McClung . |
| 3,258,369 | 6/1966 | Blaich . |
| 4,418,823 | 12/1983 | Romick . |
| 4,955,503 | 9/1990 | Propes . |
| 5,004,106 | 4/1991 | Blumstock . |

*Primary Examiner*—Joseph M. Moy
*Attorney, Agent, or Firm*—John M. Harrison

[57] ABSTRACT

A cover for closing a divided chemical dispensing container or hopper mounted on agricultural chemical-dispensing equipment. The cover closes the top of the hopper and includes a shim that seats on the divider that divides the interior of the hopper into two compartments of approximately equal size. The hopper cover is removably mounted on the top of the hopper and engages the slotted divider shim seated on the divider, to enclose the granular chemical contents of the hopper. In a preferred embodiment the hopper cover is characterized by a conventional first opening which communicates with one of the hopper compartments designed to contain a toxic chemical such as a granular insecticide. A hinged cover opens on a raised cover lip extending from the hopper cover to access a second cover opening that communicates with the opposite compartment, typically containing a granular, non-toxic fungicide. The hopper cover is fitted with a perimeter seal for sealing the perimeter of the cover on the hopper and with a divider seal for sealing the divider shim and isolating the toxic granules from the non-toxic granules inside the hopper when the hopper cover is placed on the hopper.

19 Claims, 1 Drawing Sheet

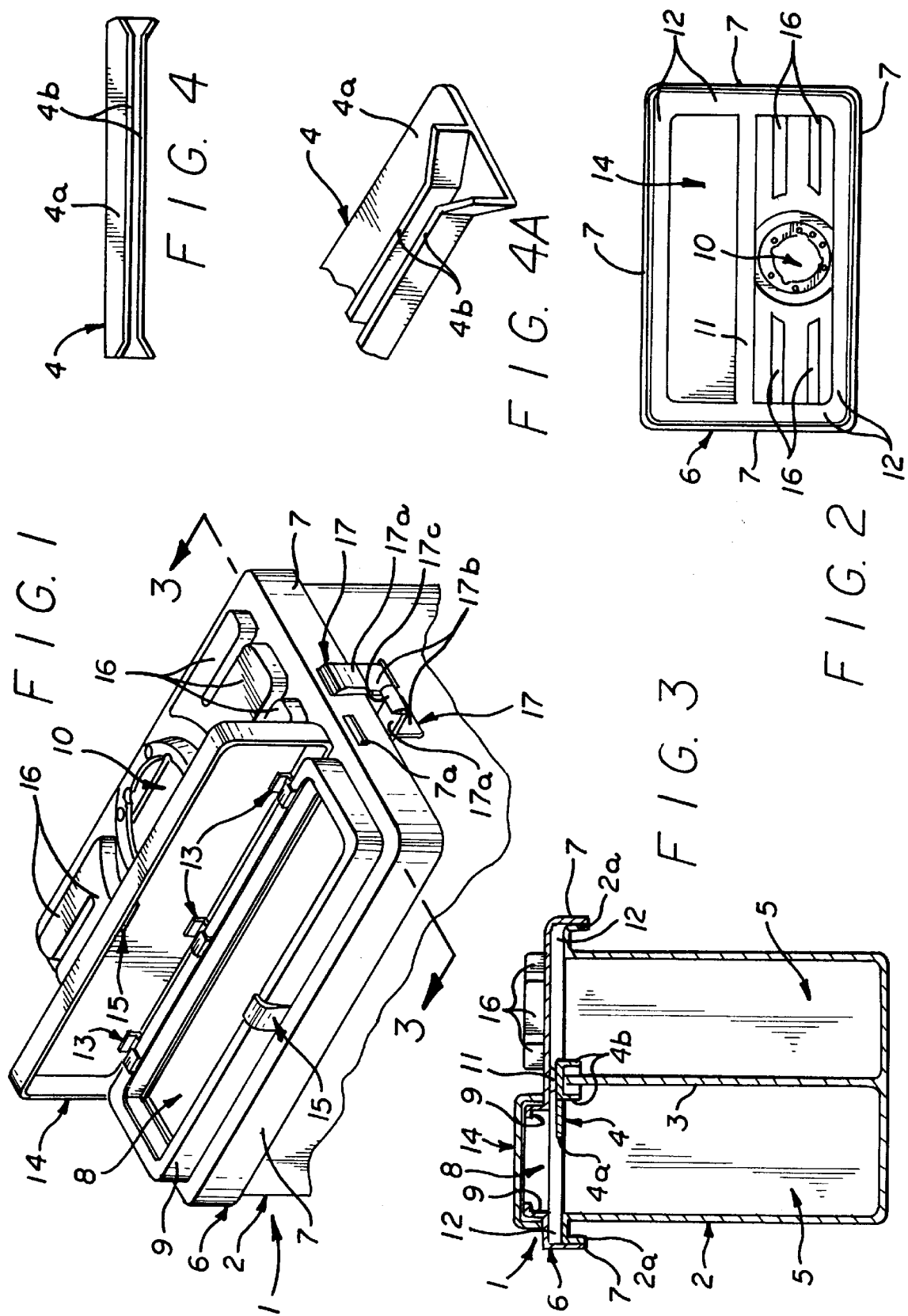

COVER FOR CHEMICAL DISPENSING HOPPER

BACKGROUND OF THE INVENTION

FIELD OF THE INVENTION

This invention relates to fertilizer containers mounted on agricultural chemical-dispensing equipment and more particularly, to a split top, lock and load cover for a fertilizer container or hopper. The cover is designed to isolate various types of agricultural chemicals in a single hopper having a vertical divider which divides the interior of the hopper into two compartments of substantially equal volume. The hopper cover of this invention is preferably removably fitted to the hopper and includes an opening for introducing a toxic, typically pellitized or granulated agricultural chemical such as an insecticide, into one of the compartments of the hopper. A lid or cover is hinged on a lip raised from the hopper cover adjacent to the toxic chemical opening and is designed to open and facilitate introduction of a pelletized or granular, typically non-toxic agricultural chemical such as a fungicide through a lip opening into the second compartment of the hopper. A seal is provided around the perimeter of the hopper cover and also across the hopper cover at the divider to accommodate a divider shim and prevent mixing of the toxic chemical from the first hopper compartment into the adjacent hopper compartment, as well as exposure of the handler to the toxic chemical.

One of the problems realized in the use of conventional hoppers and agricultural chemical containers mounted on chemical distribution equipment in farming operations is that of inadvertent spillage of toxic, typically granular agricultural chemicals such as insecticides from a divided hopper having a removable access hopper cover. This spillage and leakage frequently exposes the handler and/or applicator to the toxic chemical, thus presenting a health hazard. Conventional split, granular hoppers or containers are typically divided into two compartments of substantially equal size by means of a vertical divider and the hopper is closed by a "lock and load" cover having an opening for introducing toxic granular agricultural chemicals into one of the divided compartments in the hopper. However, the cover must be removed to introduce the second of the two agricultural chemicals in the adjacent compartment, sometimes resulting in spillage and increased labor costs, as well as contamination of the handler with the toxic chemical. Since various types of agricultural chemicals such as insecticides are hazardous to one's health, minimum contact with the toxic chemical is desirable, especially under circumstances where the hopper must be refilled several times each day to complete the treatment of a field or fields.

Accordingly, it is an object of this invention to provide a new and improved hopper cover for a vertically-divided hopper, which hopper cover is characterized by a sealed perimeter and an opening designed for accommodating a "lock and load" fitting provided on one side of the cover. The "lock and load" opening allows introduction of a selected type of a typically granular, toxic agricultural chemical into a first underlying compartment and sealing the toxic chemical therein. A hinged element opens on a raised lip to facilitate introducing a non-toxic agricultural chemical through a second cover opening into the opposite compartment of the hopper.

Another object of this invention is to provide a new and improved hopper cover for mounting on the vertically-divided hopper of agricultural chemical-dispensing equipment, which cover includes a perimeter seal and also a divider seal extending above the divider in the hopper and a first opening for introducing a selected chemical into one of the divided compartments in the hopper. A slotted divider seal shim is fitted along the upper edge of the hopper divider for engaging the divider seal on the hopper cover and sealing the compartments of the hopper, and a hinged cover is removably hinged to a raised cover lip for introducing a second chemical through a second cover opening into the second hopper compartment.

A still further object of this invention is to provide a new and improved hopper cover for removably mounting on the top edge or flange of a conventional, vertically-divided hopper for containing two granular agricultural chemicals, which hopper cover is characterized in a preferred embodiment by a plastic cover having a flanged edge, latch slots provided on opposite flanged edges for receiving latch elements on the hopper and securing the hopper cover to the hopper, a peripheral seal and a central divider seal. A "lock and load" opening communicates with a first one of the divided compartments in the underlying hopper for introducing a first, typically toxic chemical such as an insecticide, into the first compartment of the hopper and sealing the toxic chemical therein. A lid is hinged to a raised cover lip, typically by means of loop or pile fastener strips, wherein the cover can be lifted on the cover hinges to expose a second opening defined by the raised cover lip and facilitate introducing a second, typically non-toxic chemical such as a fungicide, into the opposite compartment of the vertically-divided hopper. A removable, slotted divider shim may be positioned between the divider seal and the hopper divider for sealing the contents in the hopper compartments from each other.

SUMMARY OF THE INVENTION

These and other objects of the invention are provided in a new and improved hopper cover for closing a vertically-divided hopper in an agricultural chemical dispensing apparatus, which hopper cover is characterized by a flanged, typically thermoplastic or thermoresin UV-resistant cover fitted on the upper edge or flange of the hopper; a resilient seal provided on the perimeter of the cover for engaging and sealing the hopper flange and also across the cover, spaced from the hopper compartment divider; and a lid hinged on a raised lip defining a lip opening, for covering one of the hopper compartments. A "lock and load" opening is also provided in the cover adjacent to the hinged lid for introducing a selected granular, typically toxic chemical into the adjacent hopper compartment, while the hinged cover allows introduction of a second, granular, typically non-toxic chemical into the first compartment of the divided hopper. The perimeter seal provided around the periphery of the cover operates to seal the toxic contents of the first compartment in the hopper from spillage and exposure to the operator and the divider seal provided on the hopper cover over the compartment divider engages a removable divider shim element fitted along the upper edge of the divider in the underlying hopper, to further seal the toxic contents from intermingling with the non-toxic material, inside the hopper.

BRIEF DESCRIPTION OF THE DRAWING

The invention will be better understood by reference to the accompanying drawing, wherein:

FIG. 1 is a perspective view of a preferred embodiment of the hopper cover of this invention, mounted on a vertically-divided hopper;

FIG. 2 is a bottom view of the hopper cover illustrated in FIG. 1;

FIG. 3 is a sectional view, taken along section lines 3—3 of the hopper cover mounted on the underlying vertically-divided hopper illustrated in FIG. 1;

FIG. 4 is a bottom view of a divider shim element of the cover hopper illustrated in FIG. 1; and FIG. 4A is a perspective view of one end of the divider shim illustrated in FIG. 4.

DESCRIPTION OF THE PREFERRED EMBODIMENTS

Referring initially to FIG. 1 of the drawing, the hopper cover of this invention is generally illustrated by reference numeral 6 and is designed to removably mount on the hopper flange 2a of a chemical-dispensing hopper 2, provided on a chemical dispensing apparatus (not illustrated). The hopper 2 is conventional in design and contains a vertical hopper divider 3, which defines a pair of chemical-containing compartments 5 of substantially equal volume. As illustrated in FIGS. 3, 4 and 4A, a divider shim 4 may be removably fitted on the hopper divider 3 in combination with the hopper cover 6, for purposes hereinafter described. The divider shim 4 includes an elongated, flat seal plate 4a, provided with a pair of parallel seal flanges 4b, between which the upper edge of the hopper divider 3 is received, as illustrated in FIG. 3.

The hopper cover 6 is characterized by a downwardly-extending cover perimeter flange or edge 7, fitted with a latch slot 7a on each end of the hopper cover 6 for receiving the latch tab 17c of a conventional cover latch 17, provided on the corresponding end of the hopper 2, for removably securing the hopper cover 6 on the hopper 2, as illustrated in FIG. 1 and hereinafter further described. The hopper cover 6 includes a conventional flanged "lock and load" cover opening 10 for receiving a loading hose or fitting (not illustrated) and introducing a granular, typically toxic agricultural chemical such as an insecticide, into one of the compartments of the underlying hopper 2. An elongated lip opening 8 is provided in a cover lip 9, projecting from the hopper cover 6 adjacent to the cover opening 10 and is removably closed by a hinged lid 14, to facilitate introducing a granular, typically non-toxic agricultural chemical such as a fungicide into the adjacent compartment 5 of the hopper 2. Lid hinges 13 attach the lid 14 to the rear edge of the cover lip 9 and, in a preferred embodiment, each lid hinge 13 is characterized by a flexible hinge, such as a loop or pile element strip of a loop-pile fastener, which is stapled or otherwise attached to the inside rear edge of the lid 14 and is likewise attached to the cover lip 9. The lid 14 is thus pivotal from the open position illustrated in FIG. 1 for introduction of the non-toxic, granular chemical through the lip opening 8 into the compartment 5, to the closed position enclosing the cover lip 9, as desired, to prevent the contents of the compartment 5 from spilling from the hopper 2, as illustrated in FIG. 3. A perimeter seal 12, which may be constructed of rubber, plastic or other resilient sealing material, is provided around the perimeter of the hopper cover 6 inside the cover edge 7 for engaging and sealing the hopper flange 2a of the hopper 2. In a preferred embodiment of the invention a divider seal 11 is similarly provided longitudinally on the underside of the hopper cover 6 to align with and engage the flat divider seal plate 4a of the divider shim 4, with the seal flanges 4b seated on the hopper divider 3 when the hopper cover 6 is mounted on the hopper 2, to seal the hopper compartments 5 from each other, as illustrated in FIG. 3.

In operation, it will be appreciated that the hopper cover 6 of this invention operates to facilitate the introduction of a granular, typically toxic agricultural chemical such as an insecticide through the "lock and load" cover opening 10 into the corresponding underlying compartment 5 in the hopper 2 defined by the hopper divider 3, without spillage of the toxic chemical, either from the hopper 2 or across the hopper divider 3 into the adjacent hopper compartment 5. Furthermore, a granular, non-toxic agricultural chemical such as a fungicide, can be quickly and easily introduced through the lip opening 8, into the empty hopper compartment 5 adjacent to the now-filled and sealed first hopper compartment 5, by pivoting the lid 14 of the hopper cover 6 on the lid hinges 13 to provide access to the second hopper compartment 5. The non-toxic material introduced into this second hopper compartment 5 is not generally hazardous, and spillage in small quantities from the second hopper compartment 5 and occasional contact of the granules with a handler and/or applicator is therefore not a problem. Under circumstances where the hopper divider 3 is fitted with a divider shim 4 and the divider seal 11 is provided in the hopper cover 6, the toxic contents of the first hopper compartment 5 are prevented from spilling over the hopper divider 3 into the non-toxic chemical in the second hopper compartment 5, and vice-versa. If non-toxic treatment components are added to both hopper compartments 5 and if there is no reason to prevent mixing of these chemicals inside the hopper 2, the divider shim 4 may be eliminated from the hopper cover 6.

It will be further appreciated by those skilled in the art that the hopper cover 6 of this invention is most preferably constructed of an injection-moldable, UV-resistant, thermoplastic or thermoresin material such as polyethylene or polypropylene, in non-exclusive particular, according to the knowledge of those skilled in the art. Furthermore, the conventional lock and load cover opening 10 may be provided with suitable flanges and accessory equipment to accept the various nozzles and attachments (not illustrated) necessary to introduce the toxic chemical from a storage container or facility (not illustrated) directly into the hopper 2 through the "lock and load" cover opening 10 in the hopper cover 6. The non-toxic chemical may likewise be introduced into the hopper 2 through the exposed lip opening 8 of the hopper cover 6 when the lid 14 is opened on the lid hinges 13. Consequently, this design facilitates minimum user or handler and/or applicator contact with both chemicals loaded into the respective hopper compartments 5 of the hopper 2 and prevents both hazardous co-mingling of these treatment components within the hopper 2 and spillage of the components from the hopper 2. Specifically, co-mingling of the toxic component and the non-toxic chemical is prevented by the divider shim 4 mounted on the hopper divider 3, which divider shim 4 engages the divider seal 11, provided on the underside of the hopper cover 6, as well as the hopper divider 3, as illustrated in FIG. 3.

It will be further appreciated by those skilled in the art that the hopper cover 6 of this invention can be sized to fit a hopper 2 of any desired dimensions and the respective cover latches 17, which are mounted on each side of the hopper 2, may be of conventional design, according to the knowledge of those skilled in the art. Release of the hopper cover 6 from the hopper flange 2a is effected by manipulating the latch lever 17b of each cover latch 17 upwardly, to remove the corresponding latch tab 17c from the aligned latch slot 7a in the cover edge 7 of the hopper cover 6.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A hopper cover for a chemical dispensing hopper having a vertical divider dividing the hopper into two compartments, said hopper cover comprising a cover body for mounting on the hopper over the compartments and the divider; a first opening provided in said cover body and communicating with one of the compartments for introducing a first selected chemical through said first opening into said one of the compartments; a second opening provided in said cover body and communicating with the other of the compartments for introducing a second selected chemical through said second opening into said other of the compartments; removable shim means engaging said hopper cover and the divider for separating the first selected chemical from the second selected chemical; and lid means hingedly carried by said cover body for selectively opening and closing said second opening.

2. The hopper cover of claim 1 comprising hinge means connecting said lid means to said cover body for hingedly opening and closing said lid means on said cover body.

3. The hopper cover of claim 1 wherein said second opening comprises an elongated lid opening.

4. The hopper cover of claim 1 comprising hinge means connecting said lid means to said cover body for hingedly opening and closing said lid means on said cover body and said second opening comprises an elongated lid opening.

5. The hopper cover of claim 1 comprising a cover lip extending from said cover body, said cover lip defining said second opening and hingedly receiving said cover means.

6. The hopper cover of claim 5 comprising flexible hinge means connecting said lid means to said cover lip for hingedly opening and closing said lid means on said cover lip.

7. The hopper cover of claim 5 wherein said second opening comprises an elongated lid opening defined by said cover lip.

8. The hopper cover of claim 5 comprising flexible hinge means connecting said lid means to said cover lip and wherein said second opening comprises an elongated lid opening defined by said cover lip.

9. The hopper cover of claim 1 wherein said shim means comprises an elongated shim disposed between said cover body and the vertical divider, said shim having a slot for receiving the vertical divider and sealing said compartments from each other.

10. The hopper cover of claim 9 comprising rib means provided in said cover body for stiffening said hopper cover.

11. The hopper cover of claim 10 wherein said second opening comprises an elongated lid opening.

12. The hopper cover of claim 9 comprising a cover lip extending from said cover body and wherein said lid means is hingedly attached to said cover lip and said second opening is defined by said cover lip.

13. The hopper cover of claim 9 comprising rib means provided in said cover body for stiffening said hopper cover and wherein said second opening comprises an elongated lid opening defined by said cover lip.

14. The hopper cover of claim 13 comprising flexible hinge means connecting said cover lip to said lid means for hingedly opening and closing said lid means on said cover lip.

15. The hopper cover of claim 14 comprising a flat seal plate provided on said shim for engaging said cover body.

16. The hopper cover of claim 15 comprising seal means provided on said cover body for engaging the hopper and said flat seal plate of said shim and removably sealing said hopper cover on the hopper.

17. A hopper cover for an agricultural chemical dispensing hopper having hopper latches and a vertical divider for dividing the hopper into two compartments for receiving chemicals, said hopper cover comprising a cover body for mounting on the hopper over the compartments and the divider; a removable, elongated divider shim disposed between said cover body and the vertical divider and seal means provided on said cover body at least along said divider shim for sealing said compartments from each other; a first cover opening provided in said cover body and communicating with one of the compartments for introducing one of the chemicals through said first cover opening into said one of the compartments; a cover lip extending upwardly from said cover body and a second cover opening defined by said cover lip; cover hinge means attached to said cover lip; and a lid attached to said cover hinge means for hingedly opening and closing said lid over said cover opening.

18. The hopper cover of claim 17 comprising latch slot means provided on said cover body for receiving the latches on the hopper and removably securing said hopper cover on the hopper.

19. A hopper cover for removably closing an agricultural chemical-dispensing hopper having hopper latches and a vertical divider for dividing the hopper into a first compartment and a second compartment for receiving insecticide and fungicide, respectively, said hopper cover comprising a cover body for mounting on the hopper over the compartments and the divider; a removable slotted divider shim removably fitted on the upper edge of the divider and a cover seal provided on the bottom surface of said cover body for engaging the hopper and said divider shim and removably sealing the hopper cover on the hopper and the first compartment from the second compartment; a lock and load cover opening provided in said cover body and communicating with the first compartment for introducing the insecticide through said lock and load cover opening into the first compartment; a cover lip projecting upwardly from said cover body adjacent to said lock and load cover opening; an elongated lip opening defined by said cover lip and communicating with the second compartment for introducing the pesticide through said lip opening into the second compartment; flexible cover hinge means attached to said cover lip and a lid attached to said cover hinges for hingedly closing said lip opening; lid latch means carried by said cover lip and said lid for removably securing said lid over said lip opening; and latch slot means provided on said hopper cover for receiving the hopper latches and removably securing said hopper cover on the hopper.

* * * * *